(12) United States Patent
Plicanic Samuelsson et al.

(10) Patent No.: US 9,369,946 B2
(45) Date of Patent: Jun. 14, 2016

(54) METHODS AND DEVICES FOR PROVIDING SYSTEM INFORMATION OF A CELLULAR COMMUNICATION NETWORK

(71) Applicant: Sony Corporation, Tokyo (JP)

(72) Inventors: Vanja Plicanic Samuelsson, Lund (SE); Rickard Ljung, Helsingborg (SE)

(73) Assignee: Sony Corporation, Toyko (JP)

( * ) Notice: Subject to any disclaimer, the term of this patent is extended or adjusted under 35 U.S.C. 154(b) by 0 days.

(21) Appl. No.: 14/321,862

(22) Filed: Jul. 2, 2014

(65) Prior Publication Data

US 2016/0007271 A1  Jan. 7, 2016

(51) Int. Cl.
| | |
|---|---|
| *H04W 48/14* | (2009.01) |
| *H04W 40/22* | (2009.01) |
| *H04W 48/08* | (2009.01) |
| *H04W 88/04* | (2009.01) |
| *H04W 72/00* | (2009.01) |
| H04W 88/10 | (2009.01) |

(52) U.S. Cl.
CPC .............. *H04W 48/14* (2013.01); *H04W 40/22* (2013.01); *H04W 48/08* (2013.01); *H04W 72/00* (2013.01); *H04W 88/04* (2013.01); *H04W 88/10* (2013.01)

(58) Field of Classification Search
CPC ..... H04W 92/02; H04W 88/06; H04W 88/02; H04W 68/00; H04W 84/12
See application file for complete search history.

(56) References Cited

U.S. PATENT DOCUMENTS

| | | | |
|---|---|---|---|
| 2012/0213148 A1* | 8/2012 | Saito ................. | H04B 7/15542 370/315 |
| 2013/0194948 A1* | 8/2013 | Mallik ................. | H04W 24/00 370/252 |
| 2014/0133332 A1* | 5/2014 | Lee ....................... | H04W 88/04 370/252 |
| 2014/0198708 A1* | 7/2014 | Lee ...................... | H04W 76/023 370/312 |
| 2014/0248901 A1* | 9/2014 | Johnsson ............. | H04W 64/00 455/456.1 |
| 2015/0029866 A1* | 1/2015 | Liao ...................... | H04W 4/008 370/241 |
| 2015/0043354 A1* | 2/2015 | Chien ................. | H04W 72/005 370/241 |
| 2015/0045038 A1* | 2/2015 | Gao ..................... | H04W 36/22 455/438 |
| 2015/0094064 A1* | 4/2015 | Lei ...................... | H04W 76/023 455/436 |
| 2015/0271861 A1* | 9/2015 | Li ....................... | H04W 76/023 455/426.1 |

FOREIGN PATENT DOCUMENTS

WO  2014077580 A1  5/2014

OTHER PUBLICATIONS

General dynamics; 3GPP TSG-RAN2#85, R2-1411609; Resource Pool Configuration for D2D communication, (Valencia, Spain Mar. 31-Apr. 4, 2014).*

Ericsson; 3GPP TSG-WG2 #86 R2-1426404, Broadcast of ProSe control information and related procedure, (Seoul, republic of Korea, May 19-23, 2014).*

(Continued)

*Primary Examiner* — Sharad Rampuria
*Assistant Examiner* — Obidon Bassinan
(74) *Attorney, Agent, or Firm* — Renner, Otto, Boisselle & Sklar, LLP (57) ABSTRACT

To provide system information of a cellular communication network, a cellular network node of the cellular communication network transmits the system information to a user equipment. The cellular network node causes the user equipment to relay the system information to the further user equipment.

20 Claims, 6 Drawing Sheets

(56) References Cited

OTHER PUBLICATIONS

Ericsson: "Broadcast of ProSe Control Information and Related Procedures," 3GPP Draft; R2-142604—3rd Generation Partnership Program, Mobile Competence Centre, May 18, 2014, vol. RAN WG2, Retrieved from the internet: URL: http//www.3gpp.org/ftp/Meetings_3GPP_SYNC/RAN2/Docs/ [retrieved on May 18, 2014].

General Dynamics: "Resource Pool Configuration for D2D Communication," 3GPP Draft; R2-141609, 3rd Generation Partnership Program, Mobile Competence Centre, Mar. 22, 2014, vol. Ran WG2, Retrieved from the internet: URL: http//www.3gpp.org/ftp/Meetings_3GPP_SYNC/RAN2/Docs/ [retrieved on Mar. 22, 2014].

International Search Report and Written Opinion from corresponding International application No. PCT/EP2014/075635, mailed on Mar. 3, 2015.

* cited by examiner

METHODS AND DEVICES FOR PROVIDING SYSTEM INFORMATION OF A CELLULAR COMMUNICATION NETWORK

FIELD OF THE INVENTION

Embodiments of the invention relate to wireless communication systems. Embodiments of the invention relate in particular to techniques for transmitting system information blocks of a cellular communication network.

BACKGROUND OF THE INVENTION

The demand for mobile data and voice communication continues to evidence a significant growth. Examples for wireless communication systems include cellular-based wireless communication networks. Such networks include various network nodes. The network nodes may include base stations which respectively provide coverage for a radio cell. A terminal device located outside of the coverage areas of the base stations cannot communicate with a radio access network of the wireless communication system. To improve the coverage of the wireless communication system, the number and density of installed base stations may be increased to provide additional radio cells. Alternatively or additionally, dedicated repeaters may be provided. With a repeater, the signals transmitted between a base station and a terminal device may be repeated, i.e. forwarded or sent again, in order to improve network coverage. The dedicated repeaters may be fixedly installed or may be mobile devices.

In addition to the extension of coverage achievable by a deployed repeater, there may be other reasons for using a repeater. One scenario may be that the wireless communication system shall be able to dynamically increase its network coverage to support emergency services required for public safety requirements. Therefore, in such a communication system it may be required to quickly expand network coverage and/or capacity at specific locations.

To dynamically adjust the network coverage and/or capacity, device-to-device (D2D) communication may be used in which traffic is relayed by a user equipment to a further user equipment. Conventional approaches for traffic relaying may not be adequate to enhance a coverage and/or capacity for system control signaling.

SUMMARY OF THE INVENTION

There is a need in the art for techniques which allow a coverage and/or capacity for system control signaling of a radio cell to be dynamically increased at low cost. There is in particular a need for such techniques in which assistance data or other control signaling may be provided to a terminal even when the terminal is in an area having poor coverage.

According to exemplary embodiments of the invention, system information may be relayed by a user equipment to a further user equipment. The relaying may be performed using device-to-device communication. The relaying may be network-initiated. A cellular network node may determine whether the relaying of system information is to be activated and may request the user equipment to relay the system information.

The system information may include a plurality of system information blocks. The user equipment may selectively relay only a fraction of the plurality of system information blocks to the further user equipment. A control over which system information blocks are to be relayed may reside in the cellular network node.

The cellular network node may selectively cause the user equipment to relay one or several system information blocks to the further user equipment in response to a trigger event. The trigger event may indicate that the further user equipment performs a mobile data offloading, may be indicative for interference problems in a downlink from the base station to the further user equipment, and/or may indicate that the further user equipment camps on a cell which has a lower bandwidth for control signaling than a cell served by the cellular network node.

According to an embodiment, a method of providing system information of a cellular communication network is provided. The method comprises determining whether the system information is to be relayed by a user equipment to a further user equipment. A cellular network node of the cellular communication network transmits the system information to the user equipment. The cellular network node causes the user equipment to relay the system information to the further user equipment.

The system information may comprise a system information block.

The system information block may include at least some of the information elements defined in 3GPP TS 36.331.

The cellular network node may set a forwarding bit pattern which identifies at least one system information block in a series of system information blocks which is to be relayed. The cellular network node may transmit the forwarding bit pattern to the user equipment.

The forwarding bit pattern may be included in a forwarding request which does not include a system information block.

The forwarding bit pattern may be distributed over several system information blocks, such that one bit or more than one bit is respectively included in each system information block of the series of system information blocks to indicate whether the respective system information block is to be relayed.

The cellular network node may set at least one bit in a system information block to request the user equipment to relay the system information block.

The user equipment may analyze the system information block and may relay the system information block to the further user equipment in response to the analyzing. The user equipment may selectively relay the system information block only if the system information block includes a forwarding bit of the forwarding bit pattern which indicates that the respective system information block is to be relayed.

The user equipment may relay the system information block by one-to-many device-to-device communication.

The cellular network node may transmit a forwarding request to the user equipment.

The forwarding request may include an identifier of the further user equipment.

The forwarding request may include information identifying at least one system information block which is to be relayed by the user equipment. The information identifying the at least one system information block may be a forwarding bit pattern.

The cellular network node may selectively activate the relaying of the system information. The cellular network node may determine which system information blocks are to be relayed. The cellular network node may determine whether the relaying is to be performed as one-to-many communication by the user equipment or as one-to-one communication by the user equipment.

The cellular network node may selectively activate the relaying of the system information in response to detecting that the further user equipment performs a mobile data offloading. The cellular network node may selectively activate the relaying of the system information in response to detecting that the further user equipment performs a Wi-Fi data offloading. The cellular network node may cause the user equipment to relay the system information to the further user equipment selectively depending on whether the further user equipment performs the mobile data offloading.

The cellular network node may cause the user equipment to relay the system information to the further user equipment in response to detecting a trigger event. The trigger event may be receipt of a mobility event from the further user equipment. The mobility event may be a tracking area update (TAU) request.

Alternatively or additionally, the trigger event may indicate a deterioration of signal quality from the cellular network node to the user equipment. The cellular network node may monitor a received signal strength from the further user equipment at the cellular network node. The cellular network node may cause the user equipment to relay the system information to the further user equipment when the monitored received signal strength is less than a first threshold. Alternatively or additionally, the cellular network node may monitor other received signal quality parameters or indicators from the further user equipment. The cellular network node may cause the user equipment to relay the system information to the further user equipment when the monitored received signal quality is less than a predefined threshold. Thereby, the cellular network node may infer from reduced signal strength and/or signal quality in an uplink that downlink control signaling from the cellular network node to the further user equipment may be prone to be bad.

Alternatively or additionally, the cellular network node may detect an unexpected behavior of the further user equipment. The unexpected behavior may be a missing response to a paging signal and/or a missing positive or negative acknowledgment to control signaling from the cellular network node to the further user equipment. The cellular network node may cause the user equipment to relay the system information to the further user equipment when it detects such an unexpected behavior.

Alternatively or additionally, the cellular network node may detect that the further user equipment camps on a cell which has a bandwidth for control signaling which is less than a bandwidth for control signaling in a cell served by the cellular network node. The cellular network node may cause the user equipment to relay the system information to the further user equipment to take advantage of the greater capacity for control signaling in the cell served by the cellular network node.

The further user equipment may use the relayed system information for a cell selection or cell reselection.

The user equipment may relay the system information via the same wireless interface through which the system information is received by the user equipment from the cellular network node. The user equipment may transmit at least one of a device-to-device synchronization signal, a device-to-device discovery signal, or a device-to-device communication signal which includes a system information block.

The user equipment may have a wireless interface for communication with the cellular communication network and a further wireless interface different from the wireless interface. The user equipment may relay the system information block to the further user equipment by transmission over the further wireless interface.

The user equipment may be a mobile communication terminal. The user equipment may be a portable phone.

The cellular network node may be an eNodeB.

A method according to a further embodiment comprises receiving, by a user equipment, system information from a base station of a cellular communication network. The user equipment selectively relays the system information to a further user equipment in response to instructions for forwarding the system information received from the cellular communication network.

The instructions for forwarding may comprise forwarding bits which indicate which system information blocks of a plurality of system information blocks are to be relayed. The user equipment may select the system information blocks which are to be forwarded from the plurality of system information blocks based on the forwarding bits.

The user equipment may relay the system information blocks to the further user equipment over the wireless interface over which the system information is received from the cellular communication network.

The user equipment may relay the system information blocks to the further user equipment over a further wireless interface which is different from the wireless interface over which the system information is received from the cellular communication network.

A cellular network node according to an embodiment comprises a wireless interface configured to transmit system information to a user equipment. The cellular network node comprises a relaying decision logic coupled to the wireless interface. The relaying decision logic is configured to determine whether the user equipment is to relay the system information to a further user equipment. The relaying decision logic is configured to control the wireless interface to request the user equipment to relay the system information to the further user equipment.

The relaying decision logic may be configured to generate a forwarding bit pattern which identifies system information blocks which are to be relayed. One bit or more than one bit of the forwarding bit pattern may respectively be reserved per system information block. The relaying decision logic may be configured to respectively distribute the forwarding bit pattern over several system information blocks. Alternatively or additionally, the relaying decision logic may be configured to transmit a forwarding request message to the user equipment which includes the forwarding bit pattern.

The relaying decision logic may be configured to identify a system information block which is to be relayed. The relaying decision logic may be configured to set at least one bit in the system information block which causes the user equipment to relay the system information block.

The relaying decision logic may be configured to control the wireless interface to transmit a forwarding request to the user equipment which causes the user equipment to relay the system information block to the further user equipment.

The forwarding request may comprise an identifier for the further user equipment and information identifying at least one system information block which is to be relayed by the user equipment. The information may be a forwarding bit pattern.

The relaying decision logic may be configured to determine whether the further user equipment performs mobile data offloading, and/or to determine a measure for a downlink interference between the cellular network node and the further user equipment. The relaying decision logic may selectively cause the user equipment to relay the system information when the further user equipment performs mobile data offloading and/or the radio transmission between the radio access network and the further user equipment has low quality.

The cellular network node may be an evolved Node B (eNodeB).

A user equipment according to an embodiment comprises a wireless interface configured to receive system information from a base station of a cellular communication network. The user equipment comprises a processing device coupled to the wireless interface. The processing device may be configured to control the wireless interface to selectively relay the system information to a further user equipment when the cellular communication network causes the user equipment to relay the system information.

The processing device may be configured to determine from a forwarding bit pattern which system information blocks are to be relayed. The forwarding bit pattern may be distributed over several system information blocks, with one bit or more than one bit of the forwarding bit pattern being set in each system information block. The forwarding bit pattern may be included in a forwarding request message.

The system information may comprise a plurality of system information blocks. The processing device may further be configured to retrieve at least one bit from each system information block which indicates whether the respective system information block is to be relayed to the further user equipment.

The processing device may be configured to retrieve an identifier for the further user equipment and information identifying at least one system information block which is to be relayed from a forwarding request received at the wireless interface. The processing device may be configured to control the wireless interface such that the at least one system information block identified by the information is relayed to the further user equipment.

The user equipment may be configured to relay the system information blocks to the further user equipment over the wireless interface over which the system information is received from the cellular communication network. The user equipment may include the system information blocks in device-to-device synchronization signals, device-to-device discovery signals, and/or device-to-device communication signals.

The user equipment may be configured relay the system information blocks to the further user equipment over a further wireless interface which is different from the wireless interface over which the system information is received from the cellular communication network.

The user equipment may be a mobile communication terminal. The user equipment may be a portable phone.

According to another embodiment, a communication system is provided. The communication system comprises a cellular network node according to an embodiment and a user equipment according to an embodiment. The communication system may comprise a further user equipment configured to receive the system information relayed by the user equipment.

The communication system may be configured to perform the method according to an embodiment.

In the methods, devices and systems according to embodiments, a user equipment may act as a relay to enhance the coverage for control signaling. Communication between the cellular communication network and the further user equipment may be ensured also when the further user equipment is located in an area where the coverage is poor. The techniques may be used for example to secure assistance data is received when the further user equipment performs mobile data off-loading. Another scenario is that the cellular network node may cause system information to be relayed to the further user equipment when the further user equipment camps on a cell which has a low bandwidth for control signaling. This may be the case in heterogeneous networks having small cells.

In the methods, devices and systems according to embodiments, both the user equipment and the further user equipment may be in coverage of the same cell of the cellular communication network. The techniques according to embodiments allow the control signaling coverage to be enhanced dynamically by network-initiated procedures.

In the methods, devices and systems according to embodiments, the user equipment which relays the system information may be a unit which has the capability of relaying or forwarding information from a base station to the further user equipment. The repeater function may be applied at any protocol layer. The repeater function may be implemented at the physical layer. The repeater function activated in the terminal device may be operative to perform physical layer signal forwarding.

The repeater function may be implemented at the second layer, the third layer or higher layers of the Open Systems Interconnection (OSI) layer model. The repeater function which may be activated in the terminal device may be operative to perform decoding/encoding and/or demodulating/modulating information for relay functionality applied at higher protocol layers of the OSI layer model.

Although specific features described in the above summary and the following detailed description are described in the context of specific embodiments and aspects of the invention, the features of the embodiments and aspects may be combined with each other unless specifically noted otherwise.

BRIEF DESCRIPTION OF THE DRAWINGS

Embodiments of invention will now be described in more detail with reference to the accompanying drawings in which like reference numerals designate like elements.

DETAILED DESCRIPTION OF PREFERRED EMBODIMENTS

In the following, exemplary embodiments of the invention will be described in more detail. It has to be understood that the features of the various exemplary embodiments described herein may be combined with each other unless specifically noted otherwise. Identical or similar reference numerals refer to identical or similar components.

Figure 1:
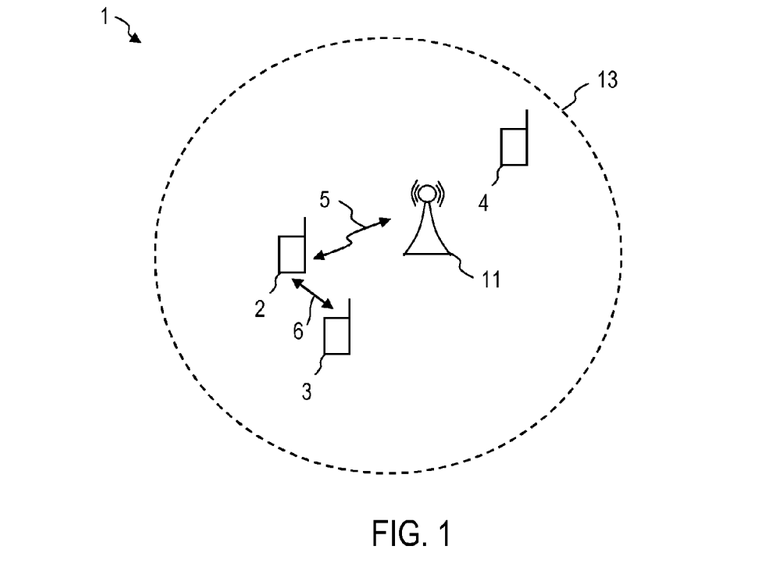
FIG. 1 shows a communication system according to an embodiment.

FIG. 1 shows a communication system 1 according to an embodiment. The communication system 1 is configured as a cellular wireless communication system. The communication system 1 may comprise a plurality of base stations. One of the base stations is shown as base station 11 in FIG. 1. The base stations may communicate with each other via wireless radio communications or via an operator core network. The communication network may be a Long Term Evolution (LTE) network. A radio access network (RAN) of the communication network may be an evolved UTRAN (E-UTRAN), with the base station 11 being an evolved Node B (eNodeB). The base station 11 may be connected to a Mobility Management Entity (MME) and/or Serving Gateway (S-GW) in the core network.

The base station 11 provides a radio cell 13 in which a user equipment 2 and a further user equipment 3 may communicate directly with the base station 11 via radio frequency communication. The user equipment 2 and the further user equipment 3 may respectively have a wireless interface for communication with the E-UTRAN.

In some cases, it may be desirable to enhance the control signaling to the further user equipment 3. For illustration, the further user equipment 3 may be located in an area in the cell 13 in which the coverage is bad. Alternatively or additionally, the further user equipment 3 may perform mobile data offloading and it may still be desirable to provide control signaling for the further user equipment. Alternatively or additionally, the further user equipment 3 may camp on a further cell different from the cell 13, and the amount of resources for downlink control signaling in the further cell may be so limited that it may be desirable to provide the control signaling to the further user equipment through the cell 13 which has higher bandwidths.

As will be explained in more detail below, a cellular network node of the cellular communication network may cause the user equipment 2 to relay system information to the further user equipment. The relaying of the system information may be implemented in such a way that the signals carrying the system information are directly transmitted from the user equipment 2 to the further user equipment 3, without being processed by the base station 11 or another node of the cellular communication network. The relaying of the system information may be performed in such a way that device-to-device (D2D) signaling or communication is performed. In the D2D signaling or communication, a wireless interface of the user equipment 2 and a wireless user interface of the further user equipment 3 which are respectively configured to communicate with the radio access network are used for relaying the system information from the user equipment 2 to the further user equipment 3. Other interfaces may be used for the relaying, such as Wi-Fi, Bluetooth, Bluetooth Low Energy (BLE), or other techniques which allow the system information to be directly relayed from the user equipment 2 to the further user equipment 3. The system information may be received by the user equipment 2 as radio signal 5 from the base station 11. The system information may be relayed from the user equipment 2 to the further user equipment 3 via another link 6 which may also be a radio link, but which does not transition the radio access network of the cellular communication network.

The system information may comprise one or more system information blocks. The system information may comprise one or more system information blocks including information elements defined in 3GPP TS 36.331. The system information may comprise one or more system information blocks including information elements defined 3GPP TS 36.331 V12.1.0 (2014-03) entitled "3rd Generation Partnership Project; Technical Specification Group Radio Access Network; Evolved Universal Terrestrial Radio Access (E-UTRA); Radio Resource Control (RRC); Protocol specification (Release 12)".

It is not required that the user equipment 2 relays all system information. For illustration, the cellular network may determine which system information blocks shall be relayed by the user equipment 2 to the further user equipment 3 and may signal to the user equipment 2 which system information blocks shall be relayed.

The system information may additionally or alternatively comprise control signaling which is different from system information blocks.

The cellular communication network may monitor any one or any combination of trigger events to determine whether the user equipment 2 shall relay system information to the further user equipment 3. For illustration, receipt of a mobility event from the further user equipment 3 may trigger the cellular communication network to cause the user equipment to relay the system information. The mobility event may be a tracking area update (TAU), for example. Alternatively or additionally, the cellular communication network may initiate a relaying of the system information by the user equipment 2 when a received signal strength for the further user equipment 3 is less than a pre-defined first threshold and/or when a signal quality (e.g. a signal to noise plus interference ratio, SINR) strength for the further user equipment 3 is less than a pre-defined second threshold. Alternatively or additionally, the cellular communication network may initiate a relaying of the system information by the user equipment 2 when it detects an unexpected behavior of the further user equipment. Examples for such an unexpected behavior may include a failure of the further user equipment 3 to respond to a paging message and/or a failure of the further user equipment 3 to transmit a positive or negative acknowledgment in response to control signaling. Alternatively or additionally, the cellular communication network may initiate a relaying of the system information by the user equipment 2 when it detects that the user equipment is attached to a cell which has a limited amount of resources for downlink control signaling. Examples for such cells include small cells in heterogeneous networks. Alternatively or additionally, the cellular communication network may initiate a relaying of the system information by the user equipment 2 when it detects that the user equipment needs assistance in cell selection or reselection, e.g. by prioritizing certain cells.

The determination whether the relaying of the system information shall be started may be made by a relaying control logic of a cellular network node. The cellular network node may be the eNodeB 11. A base station logic of the eNodeB may be operative to determine when the relaying of the system information shall be started and when the relaying of the system information shall be terminated.

The network-initiated relaying of system information may be implemented in various ways. A cellular network node may cause each Proximity Service (ProSe) enabled user equipment attached to the cell to relay the system information. This may be particularly useful when the cellular network node does not have information on proximity relations between user equipments. The cellular network node may set a forwarding bit in each system information block which is to be relayed, and each ProSe enabled user equipment may relay the system information block. The cellular communication network may activate the relaying selectively only for one user equipment 2 or a sub-set of all ProSe enabled user equipments attached to a cell. In this case, the cellular communication network may transmit a forwarding request to only one or some of the ProSe enabled user equipments. The forwarding request may include a unique identifier of the further user equipment 3 to which the system information is to be forwarded.

The relaying of the system information is not limited to being performed by only one user equipment 2. For illustration, another ProSe-enabled user equipment 4 attached to the cell may also transmit the system information for relaying it.

The user equipment 2 which relays the system information under the control of the cellular communication network may relay the system information in various ways. For illustration, the user equipment 2 may perform one-to-many communication to relay the system information to several further user equipments located in proximity to the user equipment 2. The user equipment 2 may perform one-to-one communication to relay the system information to one specific further user equipment 3.

A selective relaying of system information may be useful in various scenarios.

When the further user equipment 3 enters or operates in a data offload scenario, e.g. when it receives its data traffic via a Wi-Fi network or other non-cellular access, the further user equipment 3 could still maintain good signal quality network control signaling from the cellular base station 11. This applies even for a bad direct communication link with the cellular base station 11. This control signaling could e.g. be used to receive offloading policy (e.g. Access network discovery and selection function, ANDSF, information) from the cellular communication network. In case the communication of the further user equipment 3 and the cellular base station 11 would be downlink interference limited the cellular communication network can still maintain a supporting communication link with the further user equipment 3. The control signaling link 6 via the user equipment 2 could be used for the cellular communication network to assist with determining suitable neighbor cells.

When the further user equipment 3 and the user equipment are not within coverage of the same cellular base station 11, the relaying of system information may be used to provide the full system information of a neighboring cell to the further user equipment. This could be of interest e.g. in small cell deployment areas, e.g. in heterogeneous networks. A particular type of cell could be prioritized or requested to be utilized.

Figure 2:
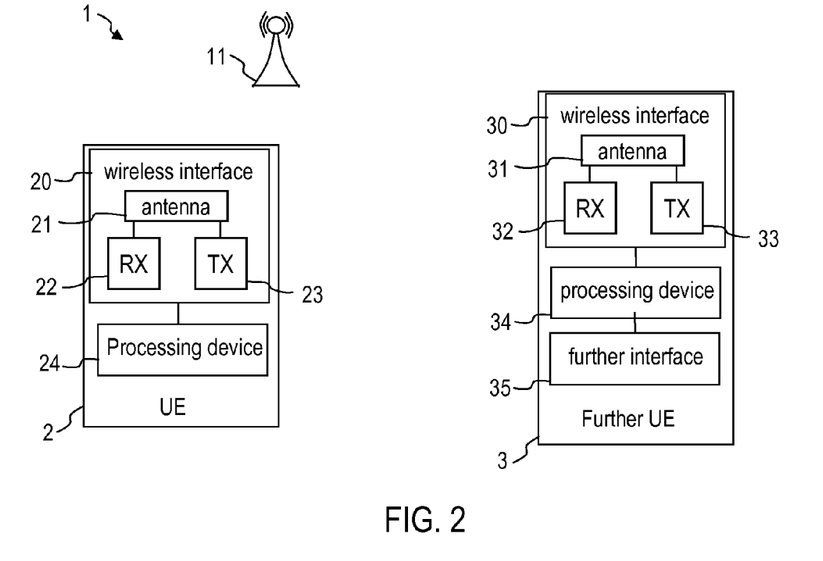
FIG. 2 is a block diagram of the communication system of FIG. 1, in which a terminal device is identified as a candidate for performing a repeater function.

FIG. 2 shows a block diagram view of the communication system 1 of FIG. 1.

The user equipment 2 has a wireless interface 20. The wireless interface 20 comprises an antenna 21, a receiver path 22 and a transmitter path 23. The wireless interface 20 is configured to communicate with the base stations 11, 12. The wireless interface 20 may be configured for communication over the eUTRA air interface. The wireless interface 20 may be configured to transmit signals to the further user equipment 3 in device-to-device discovery or communication. The wireless interface 20 may be configured to transmit a device-to-device synchronization signal (D2DSS) to the further user equipment 3.

The user equipment 2 may comprise a processing device 24 for processing signals received at the wireless interface 20. The processing device 24 may comprise one or several processors, one or several controllers, one or several microcontrollers, one or several application specific integrated circuits or a combination thereof. The processing device 24 may be configured to control the wireless interface 20 to selectively relay system information blocks or other system information to the further user equipment 3. The processing device 24 may be configured to determine, based on messages received from the cellular communication network at the wireless interface 20, which system information blocks are to be relayed. The processing device 24 may control the wireless interface 20 to selectively relay system information blocks in accordance with instructions received from the cellular communication network.

The processing device 24 may be configured to control the wireless interface 20 to perform a D2D discovery with the further user equipment 3. The processing device 24 may be configured to transmit system information blocks in accordance with instructions received from the cellular network in D2D communication.

The processing device 24 may alternatively or additionally be configured to control the wireless interface 20 such that the system information blocks which are to be relayed are included in the D2DSS or in the D2D discovery signals.

The further user equipment 3 comprises the wireless interface 30. The wireless interface 30 may comprise an antenna 31, a receiver path 32 and a transmitter path 33. The wireless interface 30 may be configured for communication over the eUTRA air interface. The wireless interface 30 may be configured to directly transmit signals to the user equipment 2 and/or receive signals from the user equipment 2. The wireless interface 30 may be configured to receive device-to-device communication signals, device-to-device discovery signals, and/or the D2DSS from the wireless interface 20 of the user equipment 2.

The further user equipment 3 comprises a processing device 34. The processing device 34 may comprise one or several integrated circuits. The processing device 34 is configured to receive the system information blocks relayed by the user equipment 2. The processing device 34 may be configured to use the system information. For illustration, the system information may be used for cell selection or cell reselection. The processing device 34 may select a cell to camp on based on the relayed system information.

The further user equipment 3 may have a further interface 35 different from the wireless interface 30. The further interface 35 may be a further wireless interface, e.g. a Wi-Fi or Bluetooth interface. The further user equipment 3 may be configured to perform mobile data offloading over the further interface 35. The further interface 35 may also be configured for communication over a fiber or other carrier. The further user equipment 3 may be configured such that the information on an offloading policy is received from the user equipment 2, which relays the information on the offloading policy from the cellular communication network to the further user equipment 3. The information on the offloading policy may comprise one or several parameters, e.g. ANDSF information.

The user equipment 2 may also have a further interface which is operative to communication with the further interface 35 of the further user equipment 3. The further interface of the user equipment 2 may be a further wireless interface, e.g. a Wi-Fi or Bluetooth interface. Relaying of the system information may be performed over the further interface of the user equipment 2 and the further interface 35 of the further user equipment 3.

Figure 3:
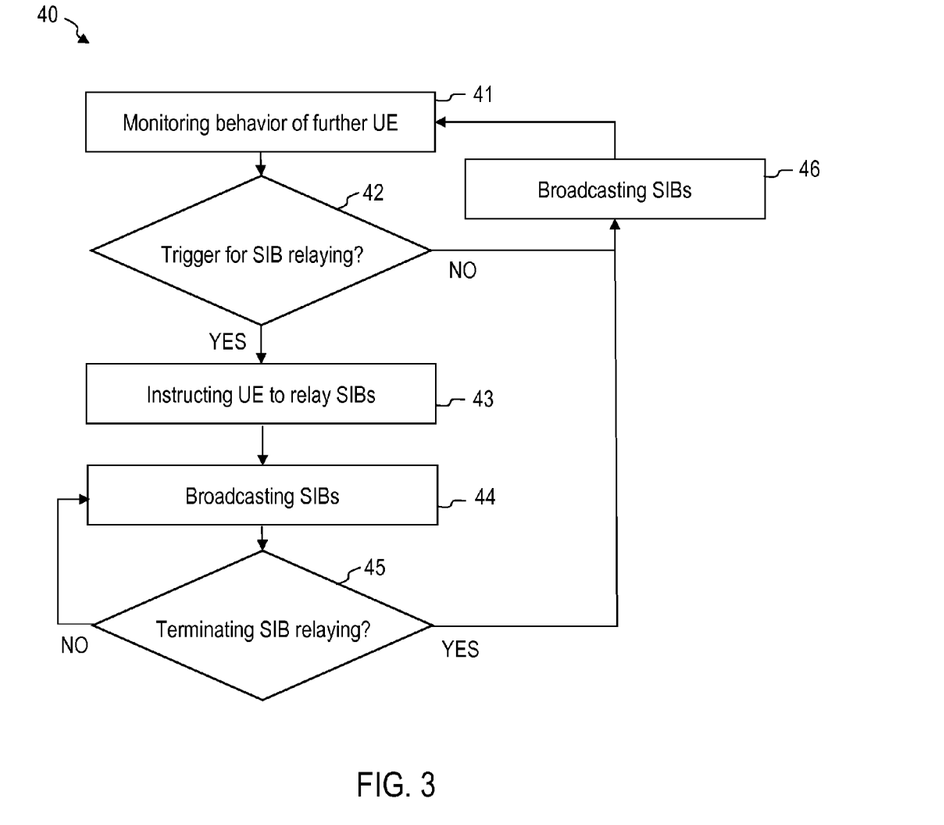
FIG. 3 is a flow chart of a method according to an embodiment.

FIG. 3 is a flow chart of a method 40 according to an embodiment. The method 40 may be performed by a cellular network node or a communication system according to an embodiment. The method 40 may be performed by a base station logic. In the method 40, a user equipment may be selectively caused to start relaying system information blocks to a further user equipment.

At 41, a behavior of the further user equipment is monitored. Monitoring the behavior of the further user equipment may comprise determining whether the further user equipment performs data offloading. Monitoring the behavior of the further user equipment may comprise determining whether a downlink interference for radio signal from the base station to the further user equipment require an enhancement of the control signaling by relaying control signaling via the user equipment. Monitoring the behavior of the further user equipment may comprise determining a measure which is representative of an interference between the base station and the further user equipment. Alternatively or additionally, monitoring the behavior of the further user equipment may comprise determining whether the further user equipment is attached to a cell which offers a bandwidth for control signaling which should be increased.

At 42, it is determined whether a trigger event for starting system information block (SIB) relaying is detected. If the trigger event is not detected, the base station may broadcast the SIBs at 46 without causing the user equipment to relay the SIBs to the further user equipment. The method may return to step 41.

The trigger event at 42 may be or may include that the further user equipment performs mobile data offloading. The trigger event at 42 may be or may include that interference in the downlink from the base station to the further user equipment is such that an enhancement of the bandwidth for downlink control signaling is desired. The trigger event at 42 may be or may include that the further user equipment is attached to a neighboring cell different from the cell served by the base station, with the neighboring cell having a bandwidth for control signaling which should be enhanced by relaying SIBs.

At 43, if the trigger event is detected at 42, the user equipment is instructed to relay SIBs. It is not required that all SIBs are relayed by the user equipment. The base station logic or a relaying decision logic of another cellular network node may determine which SIBs are to be relayed. At 44, SIBs are broadcast. The user equipment may relay SIBs to the further user equipment. The cellular network may define which one(s) of several SIBs are to be relayed by the user equipment. To this end, the cellular network may inform the user equipment which SIBs are to be relayed. The information on the SIBs which are to be relayed may be included in the message transmitted at 43 and/or in the SIBs broadcast at 44. A forwarding bit pattern may be transmitted to the user equipment which indicates which SIBs are to be relayed. The forwarding bit pattern may be included in a dedicated forwarding request message which does not need to include any SIB information elements. The forwarding bit pattern may be distributed over several SIBs, such that each SIB includes one forwarding bit or several forwarding bits which may indicate whether the respective SIB is to be relayed.

In response to receiving the forwarding bit pattern, the user equipment relays the SIBs. If a forwarding bit indicating that the respective SIB is to be relayed is included in a SIB, each ProSe enabled user equipment in the cell which receives the SIB may relay the respective SIB.

If a forwarding bit pattern indicating several SIBs which are to be relayed is included in a forwarding request message, each ProSe enabled user equipment in the cell which receives the forwarding request message may relay the SIBs indicated by the forwarding bit pattern.

The user equipment may receive a SIB, may determine based on the forwarding bit(s) whether the SIB is to be relayed, and may relay the SIB if the forwarding bit(s) indicate that the SIB is to be relayed. The relaying may be implemented as one-to-many communication or as one-to-one communication. The relaying may be performed over the wireless interface which is configured for communication with the cellular communication network. The relaying may be performed by including SIBs in D2DSS, D2D discovery signals, and/or D2D communication signals. The relaying may be performed over a further interface different from the wireless interface over which the user equipment communicates with the cellular communication network. The relaying may be performed over a Wi-Fi interface, a Bluetooth interface, a BLE interface, or other wired or wireless interfaces.

When relaying is performed, the broadcasting of SIBs may be combined with transmitting the indicators for the SIBs which are to be relayed. For illustration, and as will be explained in more detail with reference to FIG. 4 and FIG. 6 below, the indicators which indicate which SIBs are to be relayed at 44 may be included in the broadcast SIBs. The user equipment does not relay a SIB if the base station does not indicate that the respective SIB shall be relayed.

At 45, it is determined whether SIB relaying is to be terminated. If the SIB relaying is to be terminated, SIBs may be broadcast in radio signals from the base station to the further user equipment at 46. If the SIB relaying is not to be terminated, the method may return to 44. To determine whether SIB relaying is to be terminated, a terminating trigger may be monitored. An indicator relating to the further user equipment may be monitored to determine whether SIB relaying is to be determined. The terminating trigger may comprise a threshold comparison of at least one parameter. For illustration, if a signal quality or signal strength for the further user equipment has exceeded a terminating threshold, the SIB relaying may be terminated. The terminating threshold may be different from the threshold(s) at which the SIB relaying is started to provide hysteretic behavior. Alternatively or additionally, when the cellular network detects that the further user equipment stops data offloading, the SIB relaying may be terminated.

The further user equipment may be in coverage of the base station which transmits the SIBs. Even when the coverage is poor at the location at the further user equipment, the further user equipment may receive control signaling from the base station both directly and by relaying through the user equipment. When a SIB is received by the further user equipment both directly from the base station and relayed through the user equipment, the further user equipment may combine the information from both signals to reduce errors, for example.

Information on which SIBs are to be relayed may be included into the SIBs, as will be explained in more detail with reference to FIG. 4 and FIG. 6. A forwarding bit pattern may specify which SIBs from among a plurality of SIBs shall be relayed and which other SIBs shall not to be relayed. The forwarding bit pattern may be included in a message which requests the user equipment to start relaying SIBs, as will be explained in more detail with reference to FIG. 5.

Figure 4:
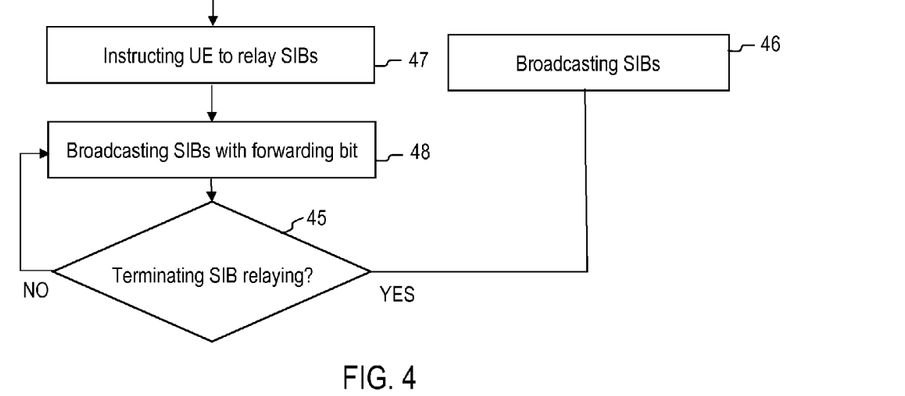
FIG. 4 is a flow chart of a method according to an embodiment.

FIG. 4 is a flow chart of a method performed by a cellular network node according to an embodiment. The method may be performed to implement a relaying of SIBs by a user equipment. Steps 47, 48 and 45 may be used to implement steps 43-45 of the method 40 of FIG. 3.

At 47, in response to the trigger for relaying, the cellular network node instructs the user equipment to relay SIBs. The request transmitted at 47 may include an identifier for the further user equipment to which the SIBs are to be relayed. The request transmitted at 47 does not need to include information on which SIBs are to be relayed.

At 48, the cellular network node broadcasts SIBs. The SIBs may include forwarding bits. One forwarding bit or more than one forwarding bit may be included in each SIB.

At 45, if it is determined that the SIB relaying shall be terminated, the method may return to broadcasting SIBs which do not include forwarding bits at 46. If it is determined that the SIB relaying shall be continued, the method may return to 48.

Figure 5:
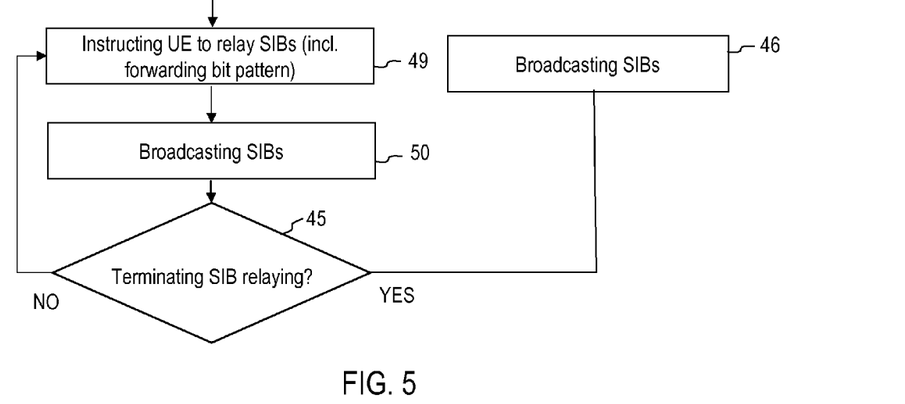
FIG. 5 is a flow chart of a method according to an embodiment.

FIG. 5 is a flow chart of a method performed by a cellular network node according to an embodiment. The method may be performed to implement a relaying of SIBs by a user equipment. Steps 49, 50 and 45 may be used to implement steps 43-45 of the method 40 of FIG. 3.

At 49, in response to the trigger for relaying, the cellular network node instructs the user equipment to relay SIBs. The request transmitted at 49 may include an identifier for the further user equipment to which the SIBs are to be relayed. The request transmitted at 49 may include information on which SIBs are to be relayed. The information on the SIBs may be in the form of a forwarding bit pattern which indicates which SIBs are to be relayed and which SIBs are not to be relayed.

At 50, the cellular network node broadcasts SIBs. The SIBs may do not need to include forwarding bits.

At 45, if it is determined that the SIB relaying shall be terminated, the method may return to broadcasting SIBs which do not include forwarding bits at 46. If it is determined that the SIB relaying shall be continued, the method may return to 49 and a new request message comprising a forwarding bit map for the next set of SIBs may be transmitted.

The cellular network node may support both procedures in which the forwarding bit(s) are included in the SIBs, as explained with reference to FIG. 4, and a procedure in which the forwarding bit(s) are included as a forwarding bit pattern in the forwarding request as explained with reference to FIG. 5. The cellular network node may decide which one of the various procedures is to be employed. For illustration, the cellular network node may determine whether several ProSe enabled user equipment should relay the same SIBs. In this case, the forwarding bits may be included in the SIBs themselves. If a number of ProSe enabled user equipments attached to the cell which shall perform the relaying is lower and/or if the SIBs which are to be relayed vary significantly from one ProSe enabled user equipment to another ProSe enables user equipment, the cellular network node may include a forwarding bit pattern in the forwarding request.

Figure 6:
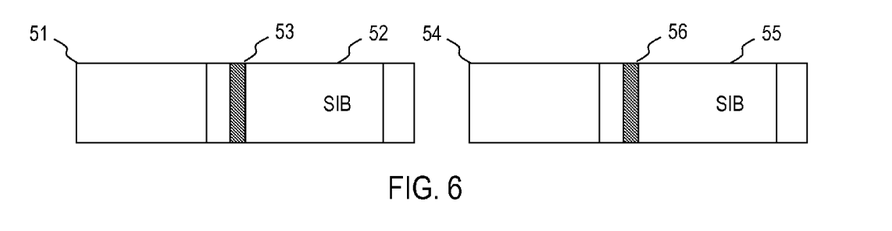
FIG. 6 is a diagram of system information blocks transmitted to a user equipment according to an embodiment.

FIG. 6 illustrates control signaling of a base station according to an embodiment. Several frames 51, 54 may respectively include a SIB. A SIB 52 may be transmitted in a frame 51. A further SIB 55 may be transmitted in a further frame 54. The SIB 52 includes one forwarding bit 53 or several forwarding bits. The forwarding bit(s) 53 indicate whether the SIB 52 is to be relayed. The forwarding bit 53 may be set to a first value to indicate that the SIB 52 shall be relayed by a user equipment which receives the SIB 52. The further SIB 55 includes one forwarding bit 56 or several forwarding bits. The further forwarding bit(s) 55 indicate whether the further SIB 55 is to be relayed. The further forwarding bit 55 may be set to a second value different from the first value to indicate that the further SIB 55 shall not be relayed by a user equipment which receives the further SIB 55.

Figure 7:
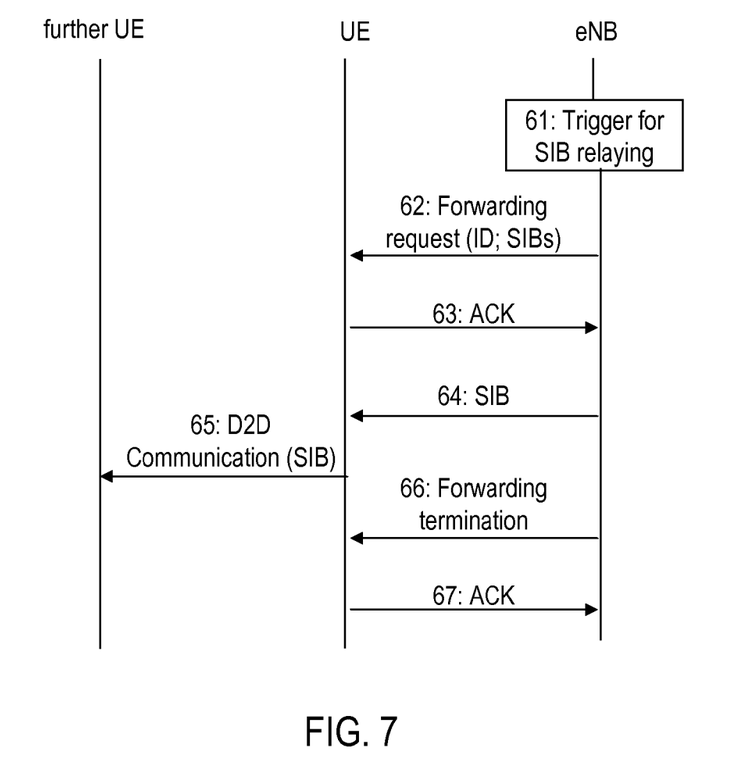
FIG. 7 is a diagram representing signaling in a communication system and method according to an embodiment.

FIG. 7 is a diagram which shows a signaling in a communication system according to an embodiment. The signaling may be performed by an eNodeB, a user equipment and a further user equipment according to an embodiment.

At 61, a cellular network node detects a trigger for starting relaying of system information.

At 62, in response to the trigger 61, the eNodeB may transmit a forward request 62 to a user equipment. The forwarding request 62 may cause the user equipment to start relaying SIBs. The forwarding request 62 may include an identifier ID for a further user equipment to which SIBs are to be relayed. The user equipment may relay the SIBs only to the further user equipment defined by the identifier ID. The forwarding request 62 may include information on which SIBs are to be relayed. The forwarding request 62 may include a forwarding bit pattern which defines, for each one of a plurality of SIBs, whether the respective SIB shall be relayed or not. The forwarding bit pattern may include one bit per SIB or several bits per SIB.

At 63, the user equipment may acknowledge receipt of the forwarding request. The eNodeB receives the acknowledgment.

At 64, the eNodeB transmits a SIB. The user equipment receives the SIB. The user equipment may determine, based on the information on the SIBs in the forwarding request 62, whether the received SIB is to be relayed.

If the forwarding request indicates that the received SIB 64 is to be relayed, a device-to-device communication 65 including the SIB is transmitted to the further user equipment. If the user equipment has not yet established a device-to-device communication link with the further user equipment, receipt of the forwarding request 62 may trigger the user equipment to perform D2D discovery.

The eNodeB may terminate the relaying of the system information. The eNodeB may transmit a forwarding termination message 66 to the user equipment. The eNodeB may generate the forwarding termination message 66 when it detects that the further user equipment stops performing mobile data offloading and/or when the further user equipment has moved into an area with good coverage which provides sufficient bandwidth for downlink control signaling.

The user equipment may transmit an acknowledgment 67 for terminating the SIB relaying.

The relaying of SIBs is network-initiated and may be performed under the control of the cellular communication network. The cellular communication network may also determine which system information is to be relayed to the further user equipment. For illustration, information on offloading policies for mobile data offloading may be relayed to the further user equipment while the further user equipment performs mobile data offloading or is about to start mobile data offloading.

Figure 8:
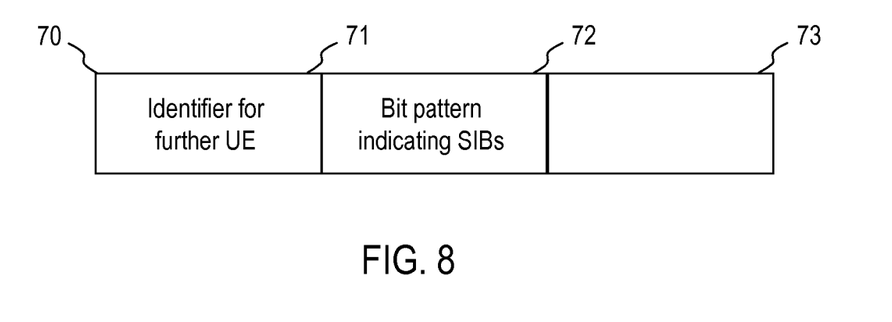
FIG. 8 is a diagram illustrating a forwarding request message transmitted to a user equipment according to an embodiment.

FIG. 8 is a diagram which shows a forwarding request 70 according to an embodiment. The forwarding request 70 may be transmitted by a base station to a user equipment to cause the user equipment to start relaying system information to a further user equipment. The forwarding request 70 may be transmitted in the signaling explained with reference to FIG. 7.

The forwarding request 70 may include an identifier 71 for a further user equipment. If the identifier 71 is omitted, the user equipment which performs the relaying may relay the SIBs as one-to-many communication to all further user equipments located in proximity to the user equipment, e.g. in D2D communication, over Bluetooth or Wi-Fi.

The forwarding request 70 may include information 72 indicating SIBs which are to be relayed. The information 72 may be a forwarding bit pattern which indicates which SIBs of a plurality of SIBs are to be relayed. The forwarding bit pattern may have one bit or more than one bit associated with each SIB.

The information 72 indicating SIBs which are to be relayed may be omitted from the forwarding request 70. The information 72 indicating the SIBs which are to be relayed may then be included in a SIB-per-SIB basis in several SIBs.

The forwarding request 70 may include other information 71, which may include a reason for the forwarding request 70, for example.

Relaying SIBs or other control signaling may be used to enhance the coverage for control signaling. This may be useful in various cases, e.g. in bad coverage areas or when the further user equipment is attached to a cell which provides a bandwidth for downlink control signaling which should be dynamically increased, as will be explained in more detail with reference to FIG. 9.

Figure 9:
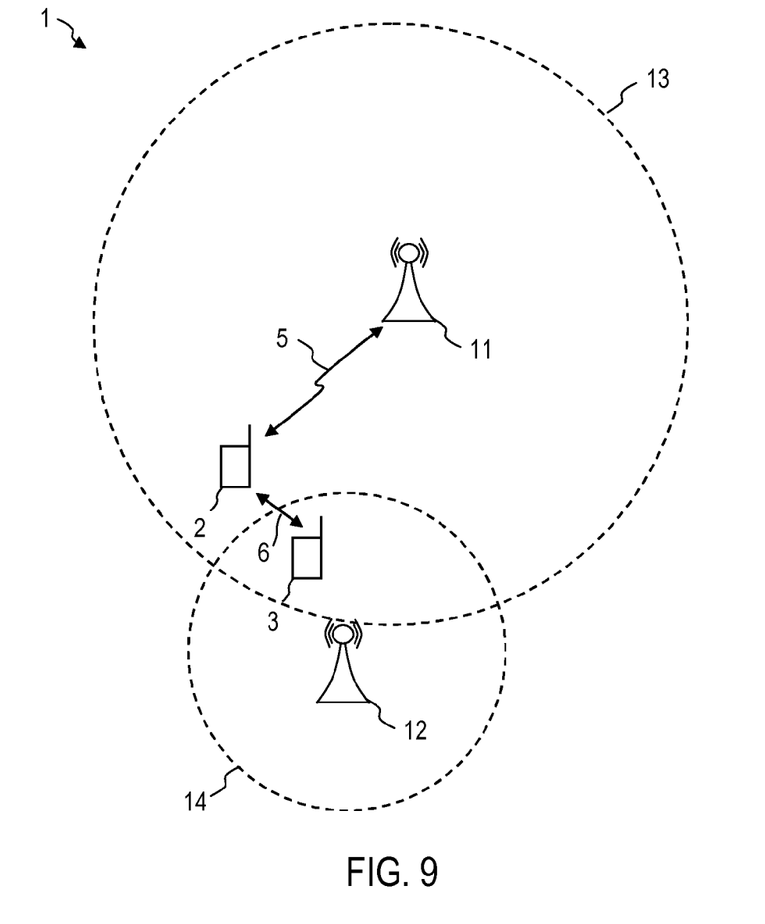
FIG. 9 shows a communication system according to an embodiment.

FIG. 9 shows a communication system 1 in which the cellular communication network is a heterogeneous network. The cellular communication network may have cells 14 which are smaller than and offer only lower signaling capabilities than a cell 13. The further user equipment 3 may be attached to the cell 14.

In some cases, e.g. for cell selection or cell re-selection, it may be desirable to dynamically increase the amount of information of downlink control signaling which may be provided to the further user equipment 3. In this case, the cellular communication network may request the user equipment 2 to relay control signaling to the further user equipment 3. The relaying may be implemented as direction communication 6, e.g. by a radio link between the user equipment 2 and the further user equipment 3 which does not transition the radio access network of the cellular communication network. The base station 11 may transmit SIBs or other control signaling to the user equipment 2 for relaying to the further user equipment 3, to provide the further user equipment 3 with the information on the neighboring cell 14. The base station 11 may alternatively or additionally transmit control signaling to the user equipment 2 for relaying to the further user equipment 3 to prioritize one of cells 13, 14 and/or to request the further user equipment 3 to camp on one of cells 13, 14.

The relaying of the SIBs by the user equipment may be performed over various interfaces and/or using different signaling. For illustration, the wireless interfaces for communication with the cellular communication network or a further interface different therefrom may be used for relaying the SIBs. SIBs may be included in various kinds of signals transmitted from the user equipment to the further user equipment in one-to-one or one-to-many communication.

As explained with reference to FIG. 7, the SIBs may be included in a D2D communication signal for relaying the SIBs to the further user equipment. This may be particularly suitable when the SIBs are to be relayed to only one specific further UE.

Figure 10:
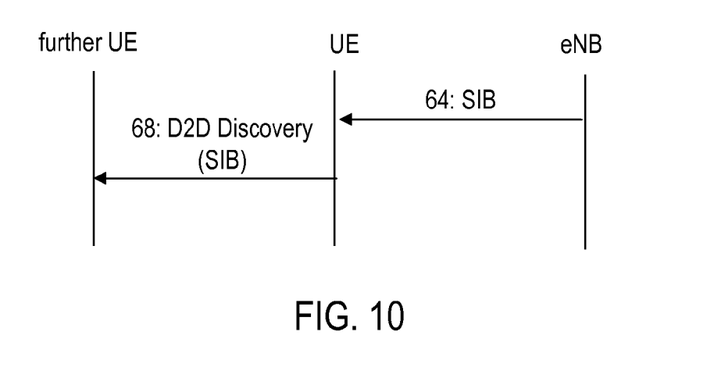
FIG. 10 is a diagram representing a relaying of system information in a communication system and method according to an embodiment.

As shown in FIG. 10, the SIB may be relayed to the further user equipment in a D2D discovery signal 68. The D2D discovery signal 68 may be a signal with which the user equipment advertises that it is capable of performing device-to-device communication. The SIB may be relayed to several further user equipments in such a D2D discovery signal. Alternatively or additionally, the D2D discovery signal 68 may be a signal with which the user equipment responds to a D2D discovery signal from the further user equipment. The SIB may be relayed to one specific further user equipment in such a D2D discovery signal.

Figure 11:
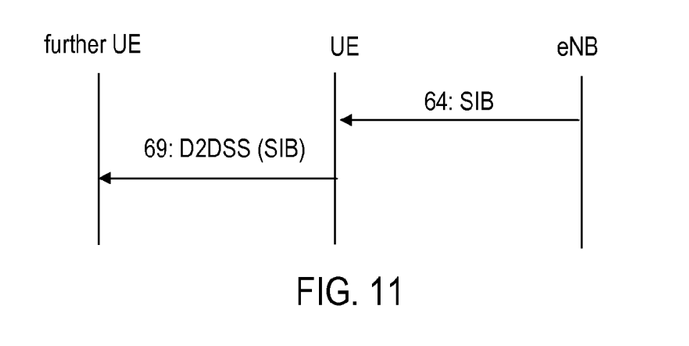
FIG. 11 is a diagram representing a relaying of system information in a communication system and method according to an embodiment.

As shown in FIG. 11, the SIB may be relayed to the further user equipment in a D2D synchronization signal, D2DSS, 69. The SIB may be relayed to several further user equipments in such a D2DSS.

The relaying of system information in methods, devices and systems according to embodiments may be performed under the control of a cellular network node. The relaying may be network-initiated. The cellular network node may also control which SIBs or other control signaling is relayed to the further user equipment.

Figure 12:
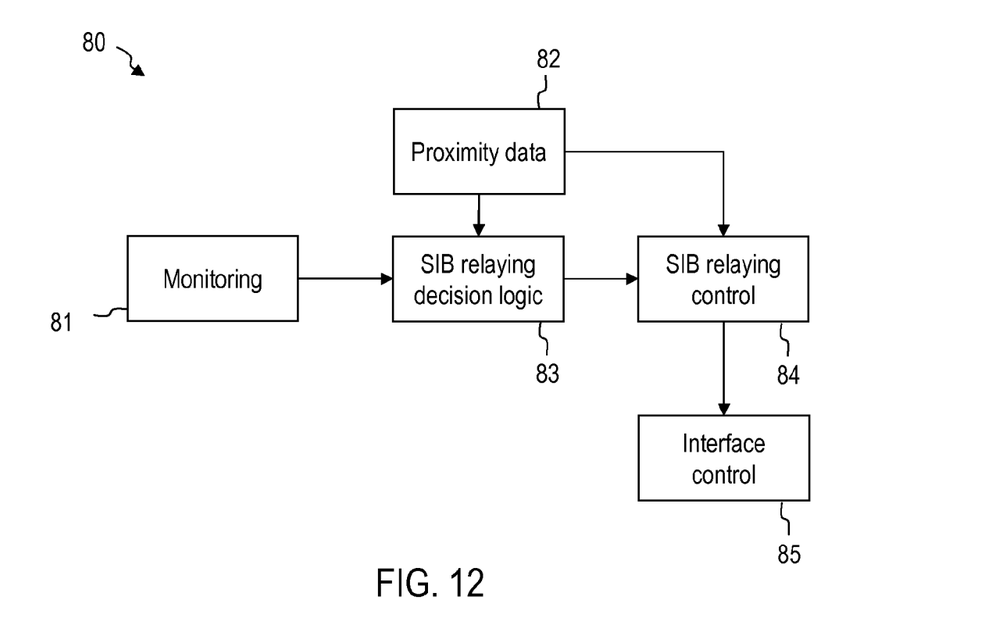
FIG. 12 is a functional block diagram of a cellular network node according to an embodiment.

FIG. 12 is a block diagram 80 of a cellular network node according to an embodiment. The cellular network node may be an eNodeB. The cellular network node may be a node different from an eNodeB. The cellular network node may be located in a core network of the cellular communication network.

The cellular network node may comprise a monitoring module 81. The monitoring module 81 may monitor whether the further user equipment is located in an area with bad coverage, and/or whether the further user equipment performs mobile data offloading, and/or whether the further user equipment is in need for an enhancement of downlink control signaling for other reasons. The monitoring module 81 may perform signal strength or quality monitoring. The monitoring module 81 may be configured to identify the further user equipment(s) attached to a cell for which an enhancement of downlink control signaling by relaying is desirable.

The cellular network node may comprise a storage device for proximity data 82. The proximity data 82 may include information on which user equipments are located in proximity to each other such that relaying of system information between a user equipment and a further user equipment is possible. The further user equipment to which system information is relayed and/or the user equipment which relays the system information may report that they are located in proximity to each other to the cellular communication network. The cellular network node may update the proximity data 82 to reflect the proximity between terminals reported to the cellular communication network.

The cellular network node may comprise a SIB relaying decision logic 83 which determines whether SIBs are to be relayed. The SIB relaying decision logic 83 may also decide which SIBs shall be relayed. The SIB relaying decision logic 83 may take these decisions based on an output of the monitoring module. The SIB relaying decision logic 83 may determine, based on an output of the monitoring module 81, that the further user equipment is located in a bad coverage area and that at least some SIBs are to be relayed to the further user equipment through the user equipment. The SIB relaying decision logic 83 may determine, based on an output of the monitoring module 81, that the further user equipment performs mobile data offloading and that at least control signaling relating to the mobile data offloading should be relayed to the further user equipment. The SIB relaying decision logic 83 may determine, based on an output of the monitoring module 81, that the further user equipment should be supported in cell selection or reselection and that at least control signaling relating to cell selection or reselection should be relayed to the further user equipment.

The cellular network node may have a SIB relaying control module 84. The SIB relaying control module 84 may generate information on which SIBs are to be relayed. The SIB relaying control module 84 may set a forwarding bit in each one of a plurality of SIBs. The forwarding bit may be set to different values depending on whether the respective SIB shall be forwarded. The SIB relaying control module 84 may generate a forwarding bit pattern which indicates, for a plurality of SIBs, which ones of the SIBs shall be relayed. The SIB relaying control module 84 may include the forwarding bit pattern in a forwarding request message transmitted to a user equipment.

The cellular network node may comprise an interface control module 85. The interface control module 85 may control a base station antenna to request the user equipment to start relaying SIBs. The interface control module 85 may control a base station antenna to request the user equipment to terminate relaying SIBs.

Embodiments of the invention have been described with reference to the drawings. In any one of the various embodiments, the procedure for causing user equipment to transition into a repeater relay for relaying system information may be implemented as a network-initiated process. Embodiments of the invention may be used without limitation to enable a terminal to reliably receive system information although e.g. it is located in a limited coverage area, to improve offloading policy reception while the terminal does not specifically use cellular access, in heterogeneous network scenarios, or as a proprietary function to enable non-3GPP devices in other way connected to 3GPP-capable UE to receive information about network signaled information from surrounding cellular networks.

The embodiments of the invention may be used to relay system information to a further user equipment which does not need to be configured for communication with the cellular communication network. For illustration, the further user equipment may be a device which is not configured for communication over the eUTRA air interface. The relaying of system information by a user equipment to such a further user equipment may be considered to be a proprietary function, which may be triggered by another proprietary function.

Modifications or alterations may be implemented in other embodiments. For illustration, control signaling other than system information blocks may be relayed by the user equipment.

For further illustration, while a user equipment may be requested to start relaying system information by a dedicated request, the user equipment may also be caused in other ways to start relaying. For illustration, a forwarding bit or several forwarding bits in a SIB may cause the user equipment to relay the SIB.

Embodiments of the invention provide a network-initiated procedure which allows a user equipment to relay system information to a further user equipment.

Although the invention has been shown and described with respect to certain preferred embodiments, equivalents and modifications will occur to others skilled in the art upon the reading and understanding of the specification. The present invention includes all such equivalents and modifications, and is limited only by the scope of the following claims.

What is claimed is:

1. A method of providing system information of a cellular communication network, the method comprising:
    determining whether the system information is to be relayed by a user equipment to a further user equipment;
    transmitting, by a cellular network node of the cellular communication network, the system information to the user equipment; and
    causing, by the cellular network node, the user equipment to relay the system information to the further user equipment, comprising:
        transmitting, by the cellular network node, a forwarding request to the user equipment before the system information which is to be relayed is transmitted to the user equipment.

2. The method of claim 1,
    wherein the system information comprises a system information block.

3. The method of claim 2,
    wherein causing the user equipment to relay the system information comprises:
        setting at least one bit in the system information block to request the user equipment to relay the system information block.

4. The method of claim 3, further comprising:
    analyzing, by the user equipment, the system information block transmitted by the cellular communication network, and
    relaying, by the user equipment, the system information block to the further user equipment in response to the analyzing.

5. The method of claim 1,
    wherein the forwarding request transmitted to the user equipment comprises a forwarding bit pattern having several bits.

6. The method of claim 5,
    wherein the forwarding request includes an identifier of the further user equipment.

7. The method of claim 5,
    wherein the forwarding request includes information identifying at least one system information block which is to be relayed by the user equipment.

8. The method of claim 1, further comprising:
    determining, by the cellular network node, whether the further user equipment performs a mobile data offloading,
    wherein the cellular network node causes the user equipment to relay the system information to the further user equipment selectively depending on whether the further user equipment performs the mobile data offloading.

9. The method of claim 1, further comprising:
    detecting, by the cellular network node, a trigger event,
    wherein the cellular network node causes the user equipment to relay the system information to the further user equipment in response to the trigger event, and
    wherein the trigger event is at least one of:
        receiving, by the cellular network node, a mobility event from the further user equipment;
        detecting, by the cellular network node, a received signal strength from the further user equipment which is less than a first threshold;
        detecting, by the cellular network node, a received signal quality indicator from the further user equipment which is less than a predefined threshold; and/or
        detecting, by the cellular network node, a behavior of the further user equipment which indicates downlink interference from the cellular network node to the further user equipment.

10. The method of claim 9, further comprising:
    using, by the further user equipment, the relayed system information for a cell selection or cell reselection.

11. The method of claim 1,
    wherein the user equipment comprises a wireless interface configured to communicate with the cellular network node,
    wherein the method further comprises:
        receiving, by the wireless interface of the user equipment, the system information, and
        relaying the system information to the further user equipment through the wireless interface of the user equipment.

12. A cellular network node, comprising:
    a wireless interface configured to transmit system information to a user equipment, and
    a relaying decision logic coupled to the wireless interface, the relaying decision logic being configured to
        determine whether the user equipment is to relay the system information to a further user equipment, and control the wireless interface to request the user equipment to relay the system information to the further user equipment, wherein the relaying decision logic is configured to control the wireless interface to transmit a forwarding request to the user equipment before the system information which is to be relayed is transmitted to the user equipment, the forwarding request causing the user equipment to relay the system information to the further user equipment.

13. The cellular network node of claim 12,
wherein the relaying decision logic is further configured to
identify a system information block which is to be relayed, and
set at least one bit in the system information block which causes the user equipment to relay the system information block.

14. The cellular network node of claim 12,
wherein the forwarding request transmitted to the user equipment comprises a forwarding bit pattern having several bits.

15. The cellular network node of claim 14,
wherein the forwarding request comprises an identifier for the further user equipment and information identifying at least one system information block which is to be relayed by the user equipment.

16. The cellular network node of claim 12,
wherein, to determine whether the user equipment is to relay the system information to the further user equipment, the relaying decision logic is configured to
determine whether the further user equipment performs mobile data offloading, and/or
determine a measure for a downlink interference between the cellular network node and the further user equipment.

17. A user equipment, comprising:
a wireless interface configured to receive a forwarding request and system information from a base station of a cellular communication network, and
a processing device coupled to the wireless interface, the processing device being configured to
process the forwarding request received from the base station before the system information is received at the wireless interface for relaying, and
control the user equipment to selectively relay the system information to a further user equipment based on the forwarding request when the cellular communication network causes the user equipment to relay the system information.

18. The user equipment of claim 17,
wherein the system information comprises a plurality of system information blocks, and
wherein the processing device is further configured to retrieve at least one bit from each system information block which indicates whether the respective system information block is to be relayed.

19. The user equipment of claim 17,
wherein the processing device is further configured to retrieve
an identifier for the further user equipment and
information identifying at least one system information block which is to be relayed
from the forwarding request received,
wherein the processing device is configured to control the wireless interface such that the at least one system information block identified by the information is relayed to the further user equipment.

20. The user equipment of claim 17, further comprising:
a further interface different from the wireless interface,
the processing device being configured to control the further interface to relay the system information to the further user equipment.

* * * * *